US012664843B1

(12) United States Patent
Callis et al.

(10) Patent No.: US 12,664,843 B1
(45) Date of Patent: Jun. 23, 2026

(54) METHODS, APPARATUSES AND COMPUTER PROGRAM PRODUCTS FOR ENABLING CONTACTLESS AUTHENTICATION TECHNIQUES TO FACILITATE ACCESS TO ASSETS

(71) Applicant: United Services Automobile Association (USAA), San Antonio, TX (US)

(72) Inventors: Shayla L. Callis, Simi Valley, CA (US); Gregory D. Hansen, Fuquay-Varina, NC (US); Ana Maldonado Wittman, San Antonio, TX (US); Subhalakshmi Selvam, Allen, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 238 days.

(21) Appl. No.: 17/733,767

(22) Filed: Apr. 29, 2022

(51) Int. Cl.
| | |
|---|---|
| *G07C 9/00* | (2020.01) |
| *H04W 4/80* | (2018.01) |
| *H04W 12/06* | (2021.01) |

(52) U.S. Cl.
CPC ..... *G07C 9/00912* (2013.01); *G07C 9/00309* (2013.01); *G07C 9/00563* (2013.01); *H04W 4/80* (2018.02); *H04W 12/06* (2013.01)

(58) Field of Classification Search
CPC ............ G07C 9/00912; G07C 9/00309; G07C 9/00563; H04W 4/80; H04W 12/06; A47G 2029/142
See application file for complete search history.

(56) References Cited

U.S. PATENT DOCUMENTS

| | | | | |
|---|---|---|---|---|
| 8,410,898 | B1 * | 4/2013 | Vasquez | G07C 9/00571 |
| | | | | 340/5.1 |
| 9,106,271 | B2 * | 8/2015 | Metivier | H04L 63/061 |
| 10,665,047 | B1 * | 5/2020 | Terp | G06Q 20/127 |
| 10,755,249 | B1 * | 8/2020 | Hill | G06Q 20/3223 |
| 10,846,668 | B1 * | 11/2020 | Hill | G06Q 20/108 |
| 12,267,814 | B2 * | 4/2025 | Oviedo | H04W 72/0446 |
| 2007/0257774 | A1 * | 11/2007 | Stumpert | G06Q 10/08 |
| | | | | 340/7.1 |
| 2017/0161820 | A1 * | 6/2017 | Friedman | G06Q 30/0635 |
| 2020/0193368 | A1 * | 6/2020 | Bhatia | H04W 4/40 |
| 2020/0210951 | A1 * | 7/2020 | Perez | H04L 63/0861 |
| 2020/0357040 | A1 * | 11/2020 | Patel | G06Q 30/0639 |
| 2020/0394604 | A1 * | 12/2020 | Kim | G06Q 10/0832 |
| 2021/0049772 | A1 * | 2/2021 | Buibas | G06Q 30/0601 |
| 2021/0049911 | A1 * | 2/2021 | Fremlin | G01C 21/3438 |

(Continued)

*Primary Examiner* — Gary S Gracia
(74) *Attorney, Agent, or Firm* — BakerHostetler

(57) ABSTRACT

A system for enabling contactless authentication techniques to facilitate access to one or more assets is disclosed. The system may receive a transaction request of at least one user involving physical delivery of an asset. The system may verify the transaction request and in response to verifying the transaction request, schedule a transaction including physical delivery of the asset. The system may determine one or more contactless authentication techniques to be used in connection with the transaction. The system may complete the transaction, according to the schedule and authentication of the at least one user, based on the one or more contactless authentication techniques.

20 Claims, 4 Drawing Sheets

(56) References Cited

U.S. PATENT DOCUMENTS

| 2022/0031105 | A1* | 2/2022 | Newcomb | H04N 7/186 |
|---|---|---|---|---|
| 2022/0066763 | A1* | 3/2022 | Kumar | H04W 4/021 |
| 2022/0156680 | A1* | 5/2022 | Tripathy | G06Q 10/047 |
| 2022/0245530 | A1* | 8/2022 | Bathe | G06Q 10/1093 |
| 2022/0270420 | A1* | 8/2022 | Hirpara | G07C 9/00309 |
| 2022/0383680 | A1* | 12/2022 | Tulsidas | H04N 7/188 |
| 2024/0127654 | A1* | 4/2024 | Apsley | G07C 9/28 |
| 2024/0153326 | A1* | 5/2024 | Saito | G07C 9/00563 |

* cited by examiner

METHODS, APPARATUSES AND COMPUTER PROGRAM PRODUCTS FOR ENABLING CONTACTLESS AUTHENTICATION TECHNIQUES TO FACILITATE ACCESS TO ASSETS

TECHNOLOGICAL FIELD

Exemplary embodiments of this disclosure relate generally to methods, apparatuses and computer program products for enabling contactless authentication techniques to facilitate access to assets.

BACKGROUND

Currently, the migration from traditional office environments to remote working arrangements and the shift from in-person shopping to online shopping with fast, at-home delivery is prevalent. This migration to remote environments may be exacerbated due to restrictions, such as for example pandemic restrictions, as it may not be possible for personnel to physically visit office environments and in-person shopping environments.

In view of the ubiquitous nature of remote environments, it may be beneficial to provide an efficient and reliable mechanism to leverage new advances and innovations for providing services and/or on-demand physical logistics in remote environments. Conventional technologies employed to date have not taken full advantage of the available and emerging technology to provide such services. A need exists to utilize already-deployed or easily-deployable technology that does not dramatically increase infrastructure or standardization costs that is capable of delivering a wider variety of services and security.

BRIEF SUMMARY

Exemplary embodiments are described for enabling contactless authentication techniques to facilitate access to assets. In some example embodiments, an asset(s) may be stored within a storage device. In order to access the asset(s) within the storage device, the exemplary embodiments may facilitate contactless and touchless security mechanisms to enable authentication of a user(s) to unlock the storage device for the user(s) to obtain the asset(s). In some example embodiments, the asset(s) may, but need not, be associated with banking, financial, insurance, real estate products and/or or services. In other exemplary embodiments, an asset(s) may be any suitable asset(s) (e.g., content items, physical items, etc.).

In one example embodiment, a method for enabling contactless authentication techniques to facilitate access to assets is provided. The method may include receiving a transaction request of at least one user involving physical delivery of an asset. The method may also include verifying the transaction request. The method may also include scheduling a transaction including physical delivery of the asset in response to verifying the transaction request. The method may also include determining one or more contactless authentication techniques to be used in connection with the transaction. The method may also include completing the transaction according to the schedule and authentication of the at least one user based on the one or more contactless authentication techniques.

In another example embodiment, a device for enabling contactless authentication techniques to facilitate access to assets is provided. The device may include one or more processors and a memory including computer program code instructions. The memory and computer program code instructions are configured to, with at least one of the processors, cause the device to at least perform operations including receiving a transaction request of at least one user involving physical delivery of an asset. The memory and computer program code are also configured to, with the processor, cause the device to verify the transaction request. The memory and computer program code are also configured to, with the processor, cause the device to schedule a transaction including physical delivery of the asset in response to verifying the transaction request. The memory and computer program code are also configured to, with the processor, cause the device to determine one or more contactless authentication techniques to be used in connection with the transaction. The memory and computer program code are also configured to, with the processor, cause the device to complete the transaction according to the schedule and authentication of the at least one user based on the one or more contactless authentication techniques.

In yet another example embodiment, a computer program product for enabling contactless authentication techniques to facilitate access to assets is provided. The computer program product includes at least one computer-readable storage medium having computer-executable program code instructions stored therein. The computer-executable program code instructions may include program code instructions configured to facilitate receipt of a transaction request of at least one user involving physical delivery of an asset. The computer program product may further include program code instructions configured to verify the transaction request. The computer program product may further include program code instructions configured to schedule a transaction including physical delivery of the asset in response to verifying the transaction request. The computer program product may further include program code instructions configured to determine one or more contactless authentication techniques to be used in connection with the transaction. The computer program product may further include program code instructions configured to complete the transaction according to the schedule and authentication of the at least one user based on the one or more contactless authentication techniques.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The following drawings show generally, by way of example, but not by way of limitation, various examples discussed in the present disclosure. In the drawings.

Figure 1:
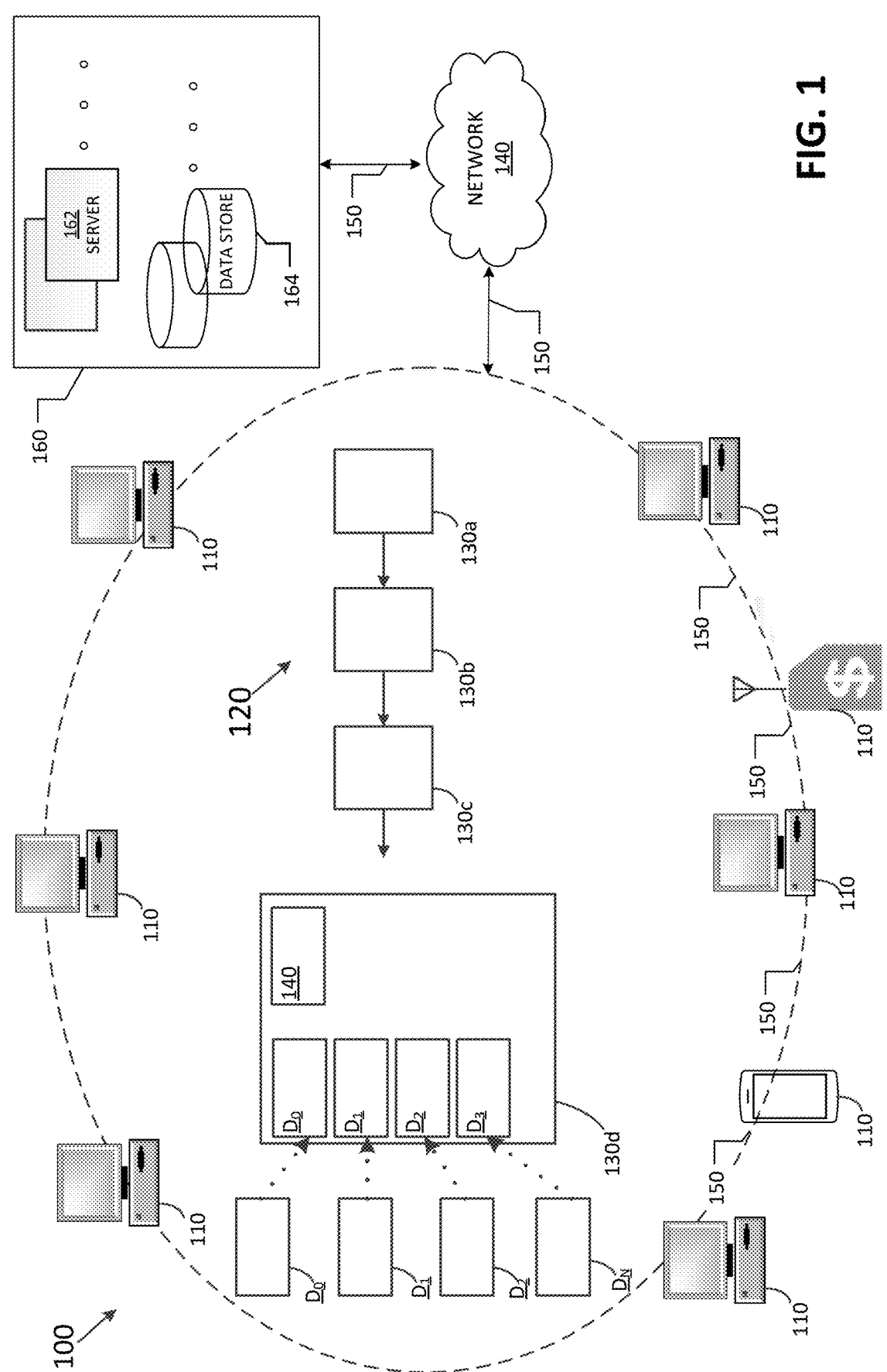
FIG. 1 shows an example distributed system architecture.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

Exemplary System Architecture

FIG. 1 shows an example distributed system 100 that may maintain a blockchain 120 storing one or more non-fungible token (NFTs). The distributed system 100 may comprise a peer-to-peer network. The distributed system 100 may comprise a network of nodes 110 and a network device 160. Additionally, the distributed system 100 may include any suitable network such as, for example, network 140. As an example and not by way of limitation, one or more portions of network 140 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 140 may include one or more networks 140. A node 110 may comprise a computing device, a central processing unit, a graphical processing unit, a field programmable gate array, or an application specific integrated circuit. A node 110 may comprise an Internet of Things ("IoT") device, such as a device with computing capabilities or network connectivity capabilities.

Links 150 may connect the nodes 110 to network 140, network device 160 and/or to each other. This disclosure contemplates any suitable links 150. In some exemplary embodiments, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In some exemplary embodiments, one or more links 150 may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout system 100. One or more first links 150 may differ in one or more respects from one or more second links 150.

Network device 160 may be accessed by the other components of system 100 either directly or via network 140. As an example and not by way of limitation, nodes 110 may access network device 160 using a web browser or a native application associated with network device 160 (e.g., a mobile application, a networking application, a messaging application, another suitable application, or any combination thereof) either directly or via network 140. In exemplary embodiments, network device 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In exemplary embodiments, each server 162 may include hardware, software, or embedded logic components or a combination of two or more such components for carrying out the appropriate functionalities implemented and/or supported by server 162. The network device 160 may include one or more data stores 164. Data stores 164 may be utilized to store various types of information. In exemplary embodiments, the information stored in data stores 164 may be organized according to specific data structures. In some exemplary embodiments, the information stored in data stores 164 may be transactions, digital assets and any other suitable data. Some exemplary embodiments, each data store 164 may be a relational, columnar, correlation, or other suitable database. Although this disclosure describes or illustrates particular types of databases, this disclosure contemplates any suitable types of databases. Some exemplary embodiments may provide interfaces that enable nodes 110 and/or another system to manage, retrieve, modify, add, or delete, the information stored in data store 164.

Network device 160 may provide users of the system 100 the ability to communicate and interact with other users. The network device 160 may provide users with the ability to take actions on various types of items or objects, supported by network device 160. In particular exemplary embodiments, network device 160 may be capable of linking a variety of entities. As an example and not by way of limitation, network device 160 may enable users to interact with each other as well as receive content from other systems (e.g., third-party systems) or other entities, or to allow users to interact with these entities through an application programming interfaces (API) or other communication channels.

The network of nodes 110 may function as a decentralized database—a database without a central administrator or centralized storage. For example, each node 110 in the network may store a copy of a collection of data, such as entries and/or transactions. The data may be replicated, shared, or synchronized across the nodes 110. The decentralized database may be continually reconciled, such as to reflect changes to the collection of data. The nodes 110 may continually or periodically transmit or download the most recent version of the collection of data, such as from each other. When a node 110 joins the network, the node 110 may automatically download the collection of data, such as from one of the other nodes 110.

The decentralized database may comprise a blockchain 120. A blockchain 120 may comprise one or more blocks 130 in which data is recorded. The blocks 130 in the blockchain 120 may be function as a mechanism to organize the data in the blockchain 120. For example, the blocks 130 may be linked in a sequence determined by a relationship of the data in the blocks 130, such as the chronology in which the data is recorded or validated. The blocks 130 may be linked to deter retroactive modification of data in the block-chain 120.

The nodes 110 in the network may build the blockchain 120, such as by adding blocks 130 to the blockchain 120. The nodes 110 may perform several operations to build the blockchain 120. For example, when new data $D_0$, $D_1$, $D_2$, DN is received by the network, the nodes 110 may validate the new data $D_0$, $D_1$, $D_2$, DN. As an example, if the new data $D_0$, $D_1$, $D_2$, DN comprises transactions, the nodes 110 may validate, verify, or authenticate the identity of the parties to the transaction. A transaction may comprise an indication of an NFT, such as a web address or uniform resource locator (URL) to the NFT. The transaction may comprise an indi-cation of a party transferring the NFT and/or a party receiv-ing the NFT, such as public keys, wallet addresses, and/or digital signatures of the parties. The digital signature may comprise the hash of transaction data, such as with a cryptographic hash function. The digital signature may comprise a hash of transaction data encrypted with a private key corresponding to the public key. Examples of hash functions include MD4, MD5, SHA-1, SHA-256, SHA-512, and SHA-3. The digital signature may be validated by the nodes 110, such as by decrypting the digital signature using the public key. The digital signature may allow for verifi-cation of the transaction while maintaining the anonymity of the parties to the transaction.

The nodes 110 may collate the new data $D_0$, $D_1$, $D_2$, DN into a new block 130*d*. The nodes 110 may perform an operation to add the new block 130*d* to the chain 120. For example, if the data in the blocks 130 is related chronologi-cally, such as where the first block 130*a* in the chain records or stores older data than the data of subsequent blocks 130*b*, 130*c*, the nodes 110 may perform a timestamp function to log the sequence in which blocks 130 are added to the blockchain 120. The nodes 110 may append a hash of the previous block 130*c* to the new block 130*d*. The nodes 110 may insert an output of the previous block 130 in an input of the new block 130*d*. The chaining of the blocks, such as through iterative functions, may deter retroactive modifica-tion of data in a block 130 as the modification would require new functions to be performed for all of the subsequent blocks 130 in the chain 120.

The nodes 110 may be incentivized to perform the opera-tion to add a new block 130*d* to the blockchain 120. For example, a block 130*d* may be assigned a value, such as a coin or unit of digital currency that will be transferred to one or more nodes 110 that perform part of all of the operation. A digital currency may comprise a cryptocurrency, such as Bitcoin, Litecoin, or TorCoin. The value may depend on the difficulty of performing the operation for the block 130*d*. Also, if the data $D_0$, $D_1$, $D_2$, DN recorded in a block 130*d* comprises transactions, a transaction may assign a transac-tion fee which may be transferred to one or more nodes 110 that perform the operation on the block 130*d* in which the transaction is recorded. If an incentive is provided for nodes 110 to perform the operation to add the new block 130*d* to the chain 120, performance of the operation may be referred to as mining.

Nodes 110 may work together to perform the operations to build the blockchain 120. For example, the nodes 110 may lend or combine their processing power, such as in a pool, to perform an operation to build the chain 120. If the nodes 110 work in tandem, incentives, such as the values of blocks or fees associated with transactions, may be divided amongst the nodes 110. For example, a node 110 may receive a portion of an incentive or transaction fee propor-tional to the contribution of the node 110 to the work to build a block or validate a transaction.

Once the operation is performed to add a new block 130*d* to the blockchain 120, the nodes 110 may communicate the new block 130*d* to the network. The nodes 110 may express their acceptance of the new block 130*d* to the chain 120 by working off the block 130*d* (e.g., using this as authoritative or controlling) when performing the operation to add a subsequent block to the chain 120. If more than one version of the chain 120 exists, the nodes 110 may attempt to work off the longest chain 120. The longest chain 120 may be determined by an algorithm for scoring the chain 120. For example, a chain 120 may be assigned a score based on the computational work required to create the chain 120. A node 110 may communicate the longest chain 120 that the node 110 has observed to the network, such as with a gossip protocol.

The network may have self-correcting mechanisms, such as to address discrepancies between nodes 110 in the net-work. For example, if there is a fork in a blockchain 120, a node 110 working off one branch of the blockchain 120 may switch to a second branch of the blockchain 120 if the second branch becomes longer than the first branch. As another example, if a node 110 does not receive a block 130, the node 110 may request the block 130 when it receives the next block 130 and determines that it did not receive the previous block 130.

It should be pointed out that although FIG. 1 shows one network device 160 and eight nodes 110 any suitable num-ber of network devices 160 and nodes 110 may be part of the system of FIG. 1 without departing from the spirit and scope of the present disclosure.

Exemplary Computing Device

Figure 2:
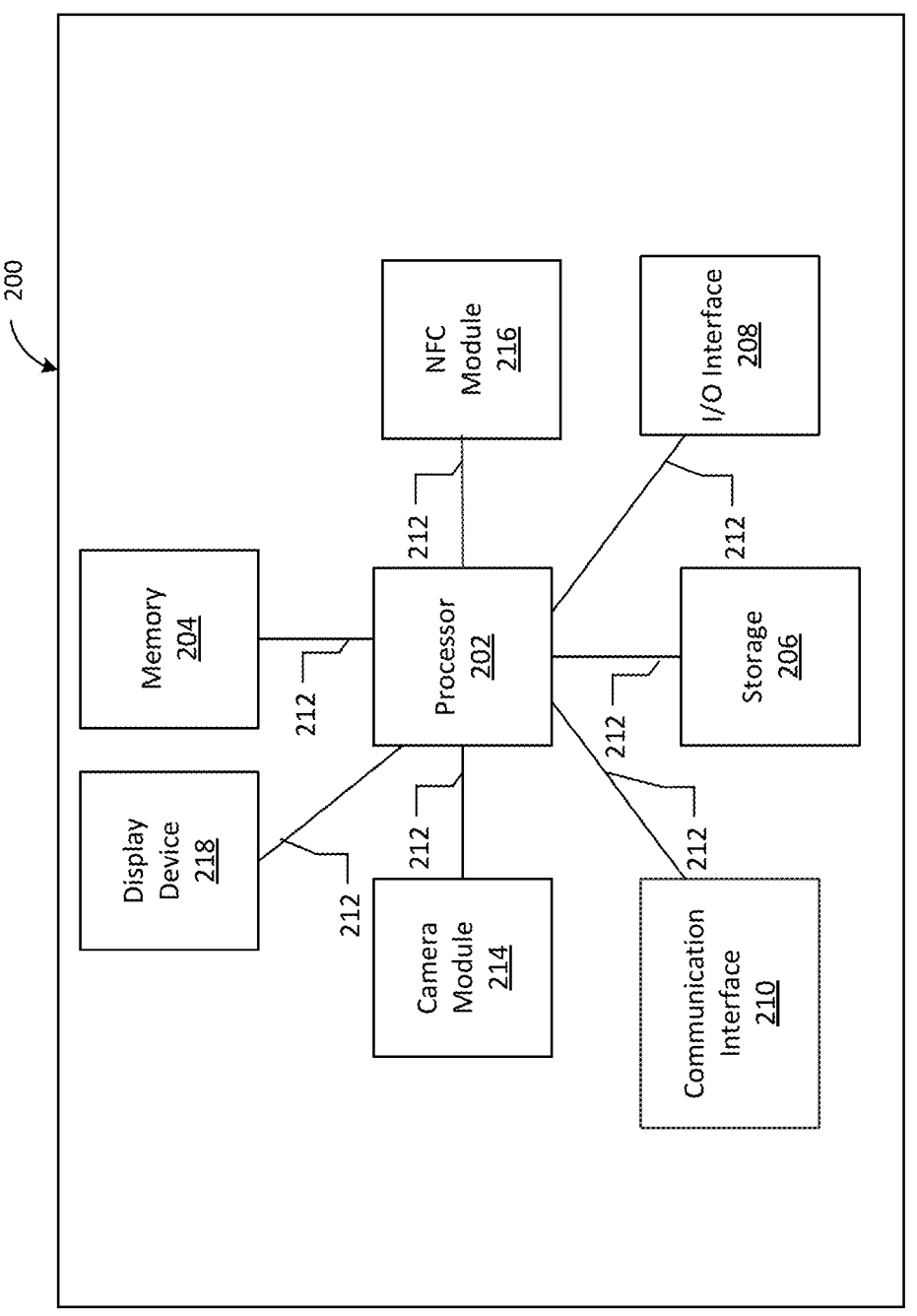
FIG. 2 is a diagram of an exemplary computer system in accordance with an exemplary embodiment.

FIG. 2 illustrates an example computer system 200. In some exemplary embodiments, one or more computer sys-tems 200 perform one or more steps of one or more methods described or illustrated herein. In particular exemplary embodiments, one or more computer systems 200 provide functionality described or illustrated herein. In some exem-plary embodiments, software running on one or more com-puter systems 200 may perform one or more steps of one or more methods described or illustrated herein or provides functionality described or illustrated herein. Particular exemplary embodiments may include one or more portions of one or more computer systems 200. Herein, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates com-puter system 200 taking any suitable physical form. As example and not by way of limitation, computer system 200 may be an embedded computer system, a system-on-chip (SOC), a single-board computer system (SBC) (such as, for example, a computer-on-module (COM) or system-on-mod-ule (SOM)), a desktop computer system, a laptop or notebook computer system, an interactive kiosk, an automated teller machine (ATM), a mainframe, a mesh of computer systems, a mobile telephone, a personal digital assistant (PDA), a server, a tablet computer system, an augmented/virtual reality device, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In particular exemplary embodiments, computer system 200 includes a processor 202, memory 204, storage 206, an input/output (I/O) interface 208, a communication interface 210, a bus 212, a camera module 214, a Near Field Communication (NFC) module 216, and a display device 218. The display device 218 may be configured to display one or more content items, video, images or the like. Although this disclosure describes and illustrates a particular computer system having a particular number of particular components in a particular arrangement, this disclosure contemplates any suitable computer system having any suitable number of any suitable components in any suitable arrangement. In some exemplary embodiments, the NFC module 214 may enable communications between at least two devices within a predetermined proximity threshold distance (e.g., 20 centimeters (cm), 10 cm, etc.). The NFC module 216 may electronically identity documents, transactions, smart cards, keycards and/or any other suitable NFC content, cards and/or the like within the predetermined proximity threshold distance. The NFC module 216 may facilitate contactless (CTLS) transactions such as, for example, contactless payments and may facilitate mobile payment. In some exemplary embodiments, the computer system 200 may provide the NFC content detected from a device to a network device (e.g., network device 160) to enable the network device to facilitate the CTLS transaction(s). In some exemplary embodiments, the NFC module 216 may utilize radio-frequency identification (RFID) technology, Bluetooth technology or the like.

In some exemplary embodiments, the camera module 214 may be configured to capture one or more images and/or video of one or more real world objects. The camara module 214 may be configured to perform biometric features such as, for example, facial recognition by matching one or more faces associated with a captured digital image(s) and/or a video(s) against one or more images/videos associated with faces stored in a memory device (e.g., memory 204). The matched faces may be provided to a network device (e.g., network device 160) to authenticate (e.g., in a contactless manner) one or more users associated with one or more services. The camera module 214 may match faces based in part on analyzing facial features from a captured image(s)/video(s) relative to similar or the same facial features of a captured image(s)/video(s) of faces stored in the memory device. In some exemplary embodiments, the digital image(s)/video(s) captured by the camera module 214 may be provided by the computer system 200 to a network device (e.g., network device 160) and the network device may match the faces in a similar manner by analyzing facial features from a captured image(s)/video(s) relative to similar or the same facial features of a captured image(s)/video(s) of faces stored in a memory device (e.g., mass storage device 604). In some example embodiments, the camera module 214 may capture an image(s) of a scan of a fingerprint of a user (e.g., in a contactless manner) and may match the fingerprint in a similar manner by analyzing fingerprint features from the captured image(s) relative to similar or the same fingerprint features of a captured image(s) of fingerprints stored in a memory device (e.g., memory 204). In alternative example embodiments, the computer system 200 may provide a scan of a fingerprint captured by camera module 214 to a network device (e.g., network device 160) and the network device may match the fingerprint in a similar manner by analyzing fingerprints from a captured image(s) relative to similar or the same fingerprint features of a captured image(s) of fingers stored in a memory device (e.g., mass storage device 604).

The processor 202 may include hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular exemplary embodiments, processor 202 may include one or more internal caches for data, instructions, or addresses. The processor 202 may include any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular exemplary embodiments, processor 202 may include one or more internal registers for data, instructions, or addresses. This disclosure contemplates processor 202 including any suitable number of any suitable internal registers, where appropriate. The processor 202 may include one or more arithmetic logic units (ALUs); be a multi-core processor; or include one or more processors 202. Although this disclosure describes and illustrates a particular processor, this disclosure contemplates any suitable processor.

In particular exemplary embodiments, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular exemplary embodiments, processor 202 may execute instructions in one or more internal registers or internal caches or in memory 204 (as opposed to storage 206 or elsewhere) and operates on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular exemplary embodiments, one or more memory management units (MMUs) may reside between processor 202 and memory 204 and may facilitate accesses to memory 204 requested by processor 202. The memory 204 may include random access memory (RAM). This RAM may be volatile memory, where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular exemplary embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular exemplary embodiments, storage 206 is non-volatile, solid-state memory. In particular exemplary embodiments, storage 206 includes read-only memory (ROM). The ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Storage 206 may include one or more storages 206. Although this disclosure describes and illustrates particular storage, this disclosure contemplates any suitable storage.

In particular exemplary embodiments, I/O interface 208 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, a camera (e.g., a still camera, a video camera), stylus, tablet, touch screen, trackball, another suitable I/O device or a combination of two or more of these. An I/O device may include one or more sensors. This disclosure contemplates any suitable I/O devices and any suitable I/O interfaces 208 for them. I/O interface 208 may include one or more device or software drivers enabling processor 202 to drive one or more of these I/O devices. I/O interface 208 may include one or more I/O interfaces 208.

Although this disclosure describes and illustrates a particular I/O interface, this disclosure contemplates any suitable I/O interface.

In particular exemplary embodiments, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular exemplary embodiments, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Exemplary System Operation

The increased trends of individuals and organizations utilizing remote environments may cause a need for banking services and financial institutions to expand their remote services to users In this regard, for example, some exemplary embodiments may utilize one or more systems (e.g., system 100) that may facilitate utilization of storage devices (e.g., nodes 110) such as for example lock boxes, lockers, safes, containers (e.g., mobile containers), other boxes or the like for pickup of assets such as banking products such as, for example, cash, money orders, checks, certificates of deposit (CDs), etc. In this manner, the storage devices may be located at locations associated with bank sites (e.g., curbside bank locations, kiosks, ATMs etc.) and/or one or more locations other than a bank site associated with a bank/financial institution (also referred to herein as bank entity). In some instances, some types of the storage devices may be located at a residence and/or place of business associated with one or more users.

For purposes of illustration and not of limitation, consider an instance in which a user of a bank entity ordered assets/products such as, for example, money orders and is physically unable to visit a bank site (e.g., a bank branch office), or desires not to visit the bank site for obtaining the money orders. In this manner, the bank entity may provide a storage device at a remote location which may or may not be affiliated with the bank entity to enable the user to obtain the money orders from the storage device. In some examples, the bank entity may provide the storage device directly to the user (e.g., the user's home). In this example, the bank entity may provide, for example via a physical delivery, the money orders in the storage device for the user to obtain. The money orders provided in the storage device by the bank entity may be secure (e.g., locked). In order for the user to obtain the asset(s) (e.g., banking product(s)) such as the money orders in this example, the storage device may be configured to provide a token or other digital asset to a communication device (e.g., a node 110) of the user which the communication device may utilize to redeem, or otherwise obtain (e.g., unlock) the asset(s) (e.g., banking product(s)) such as the money orders in this example within the storage device.

In some example embodiments, the storage device may have an NFC tag associated with the token/digital asset and in an instance in which the user having the communication device (e.g., a node 110) comes within proximity of the NFC tag in the storage device, an NFC module (e.g., NFC module 216) of the communication device may read the NFC tag and the token/digital asset and may automatically (e.g., without the user physically touching the storage device) obtain data (e.g., NFC content) associated with the user. The token/ digital asset and the obtained data (e.g., user profile/account data) may be provided by the communication device (e.g., a node 110) to a network device (e.g., network device 160) which may be utilized by the network device to authenticate the user (for example if the user has a profile/account with the bank entity and ordered the money orders in this example). In response to the network device authenticating the user, the network device may send a signal to the storage device to open/unlock the storage device such that the user may obtain the asset(s) (e.g., the money orders) stored within the storage device. In this manner, the storage device may facilitate contactless and touchless security mechanisms to enable authentication of the user to unlock the storage device for the user to obtain the asset(s) (e.g., banking product(s)) within the storage device for example at a safe location.

The exemplary embodiments may also facilitate curbside pickup of assets (e.g., banking products) at a bank site (e.g., a bank branch office) associated with the bank entity. In some exemplary embodiments, a network device (e.g., network device 160) associated with the bank entity may stage or schedule transactions which may be executed in accordance with a model associated, for example with, time slots. The transactions may, but need not, be associated with assets such as for example banking products and/or services. The transactions may include, but are not limited to, pickup of cash, checks, money orders, CDs, making payments, deposits, withdrawals and/or any other suitable transactions. The network device may schedule time slots for users to visit a curbside location associated with the bank entity to perform banking services.

A network device (e.g., network device 160) may utilize data associated with one or more vehicles of users to authenticate a user(s) associated with a transaction pertaining to a curbside banking service. For example, in some example embodiments, a communication device (e.g., a node 110) at a bank site may capture an image, via a camera module (e.g., camera module 214) of a license plate of a vehicle associated with a user having a profile and/or account associated with the bank entity for which the user is scheduled to perform a curbside banking transaction at a particular time. The communication device may provide the captured image of the license plate to a network device (e.g., network device 160). The network device may analyze the license plate of the captured image and may match the license plate with a license plate within a database of license plates (e.g., stored in a memory device (e.g., mass storage device 604)) associated with vehicles of users. In response to determining that the license plate matched the vehicle of a user associated with a user scheduled for the curbside banking service, the network device (e.g., network device 160) may authenticate (in a contactless/touchless manner) the user and authorize the user to receive/obtain an associated asset(s) (e.g., money orders, checks, etc.) while at the curbside location associated with a bank site (e.g., a bank branch office).

In some other exemplary embodiments, one or more users may utilize an application (e.g., a mobile application) associated with the bank entity to authenticate themselves with the bank entity while located at a curbside site associated with the bank entity. For instance, a user scheduled to perform a curbside transaction of pickup of an asset(s) (e.g., a product/service) may input credentials (e.g., username and/or password) into the application (e.g., mobile application) and the network device (e.g., network device 160) associated with the bank entity may verify/authenticate the user if the credentials match the credentials associated with a profile/account associated with the user. In this regard, the network device may authorize the user to receive/obtain an associated asset(s) (e.g., banking product(s) (e.g., money orders, checks, etc.)) while at the curbside location associated with a bank site (e.g., a bank branch office).

In some exemplary embodiments, the network device may send communications to one or more users of the application (e.g., mobile application) associated with the bank entity to educate and encourage use of the application by the users who may not be active users of the application and may incentive these users to utilize the application and perform paperless transactions.

The application may be utilized by users/members (e.g., users with a profile/account) associated with the bank entity to schedule bank service times and/or to meet curbside and/or at a kiosk (e.g., a node 110), an ATM (e.g., a node 110) or other entity associated with the bank entity to obtain one or more banking products/services.

In some exemplary embodiments, a network device (e.g., network device 160) associated with the bank entity may authenticate users in a touchless/contactless manner based on biometrics associated with the user. For example, in an instance in which a user is at a curbside location associated with a bank site associated with the bank entity. A user may utilize the camera module (e.g., camera module 214) of their communication device (e.g., node 110) to capture an image of their face and the image of the captured face may be provided by the communication device to the network device which may match the features of the face with facial features stored in a memory device (e.g., mass storage device 604) to authenticate the user. In response to authenticating the user, the network device may authorize the user to receive/obtain the assets (e.g., banking products) associated with the curbside site visit (for example at a particular scheduled time).

In some other exemplary embodiments, a user may scan their fingerprint at a kiosk, ATM or other entity (e.g., without touching the kiosk, ATM or other entity). The kiosk, ATM or other entity may provide the scanned fingerprint to the network device which may match the features of the fingerprint with fingerprint features stored in a memory device (e.g., mass storage device 604) to authenticate the user. In response to authenticating the user, the network device may authorize the user to receive/obtain the assets (e.g., banking products) associated with a curbside site visit (for example at a particular scheduled time).

As described above, the exemplary embodiments may provide touchless/contactless security features and may utilize vehicle recognition as well as touchless biometrics without the use of a card or keypad to authenticate users for obtaining assets (e.g., banking services/products). The assets may be obtained at a curbside location in which a user may receive/obtain (e.g., pickup) the assets.

In some exemplary embodiments, in order to facilitate large transactions (e.g., large banking transactions) in which one or more users may desire human interaction, a network device (e.g., network device 160) associated with the bank entity may facilitate a video interaction with a user by utilizing a camera to capture a video of the user in combination with a chatbot and/or human (e.g., bank teller) to provide personalized service for these transactions (e.g., large banking transactions). The network device may enable the virtual chatbot to seamlessly handoff communications to the human (e.g., bank teller) associated with the bank entity and vice versa during the communication with the user.

In some exemplary embodiments, a network device (e.g., network device 160) may utilize tokens and/or digital assets (e.g., cryptocurrency), which may be used to pay users in instances in which the bank entity may need to provide the users money and in instances in which the users may not have access to physical bank sites. For example, a token may comprise a form of cryptocurrency or digital asset. A digital currency may comprise a cryptocurrency, such as Bitcoin, Litecoin, or TorCoin. In instances in which users may not have access to physical bank sites, the network device (e.g., network device 160) may provide cryptocurrency associated with a transaction(s) to a digital wallet associated with a user. In some example embodiments, a communication device (e.g., a node 110) associated with the user may have a digital wallet to receive the cryptocurrency. In some examples, a transaction associated with cryptocurrency may have a piece of information, such as the wallet address of the user in order for the user to receive the cryptocurrency in the digital wallet. In other examples, a transaction associated with cryptocurrency may be associated with an NFT.

In some example embodiments, a network device (e.g., network device 160) may facilitate transfer of money by digital currency (e.g., cryptocurrency) and may enable conversion within a marketplace facilitated by the bank entity to allow spending of the digital currency without a digital wallet or digital card.

In some examples, a network device associated with a bank entity may facilitate catastrophe responses and may move away from insecure currency or transactions requiring fully-functioning infrastructure. In this regard, the network device may provide allocation and distribution of insurance/disaster response resources and may incentive disaster responses where needed.

In some exemplary embodiments, the network device may handle money in a jurisdiction-less manner by providing a universal store of values of money and the network device may handle the back-end conversion/processing for the value of money.

In some other exemplary embodiments, a network device (e.g., network device 160) associated with a bank entity may facilitate artificial intelligence (AI) shopping, augmented reality (AR)/virtual reality (VR) tours/inspections and may virtualize transactions as well as virtualizing insurance related transactions.

As an example, users having a profile/account associated with the bank entity may utilize an application (e.g., a mobile application), associated with the bank entity, on a communication device (e.g., a node 110) to shop for banking products as well as insurance and may facilitate banking product(s) transactions as well as insurance transactions via the application. In some examples, a camera module (e.g., camera module 214) of a communication device associated with a user may capture an image/video of an event such as a vehicle accident or property (e.g., real property (e.g., homes, office buildings, etc.) damage and may upload the image/video within the application. In response to the uploaded image/video, and a selection by a user for an AR/VR experience, the application may present to a display device (e.g., display device 218) of the communication device an AR/VR environment with details on how to handle the vehicle accident or property damage such as, for example, how to submit an insurance claim for the damage and the application may present a virtual interaction with the user and a virtual chatbot regarding the insurance claim transaction or may present an interaction with the user and a human representative to discuss the insurance claim transaction.

In other exemplary embodiments, the application may facilitate transactions with simultaneous interactions between sellers, buyers, agents and/or other entities (for example, regarding the sale and/or purchase of property or other types of transactions). The application may also provide personalized pop-ups and/or advice regarding services which the bank entity may offer to users having profiles/accounts with the bank entity. The personalized pop-ups and/or advice may be presented to display devices (e.g., display devices 218) of communication devices associated with the users.

In yet some other exemplary embodiments, the application may utilize artificial intelligence and/or machine language (ML) to recognize undisclosed perils associated with insurance services provided by a bank entity. In this regard, the application may facilitate remote inspection (e.g., of property). The application may merge/combine sources of content (e.g., related to the same event/incident) for AR/VR interaction within the application. In some examples, the content may be captured by camera modules of drones as well as other communication devices. The application may also facilitate walkthroughs (e.g., inspections) by objective or trusted third parties (e.g., property inspectors, appraisers, etc.). In this example, the application may be trained based on data using known peril sets and coincidental peril sets. Based on the application utilizing AI/ML to recognize undisclosed perils, the application may reduce length and cost of inspections (e.g., property inspections), and may identify abnormalities such as gradients, cracks, uneven or jagged lines, for example, associated with property (e.g., real estate property). Based on the application utilizing AI/ML to recognize undisclosed perils, the application may also consider effects of shadows, weather in the context of vehicle driving and may collect sensor data from a variety of sensors including but not limited to, thermal, humidity, infrared sensors.

The application may also analyze data to determine common claims for new areas, may learn characteristics of remote areas, road quality conditions, banking capabilities in areas, determine what buyers/movers of property in areas may need to know for the particular areas in which they may be buying/moving which may increase comfort for the buyers/movers.

The application may facilitate upload of user reviews for users (i.e., members) with profiles/accounts associated with a bank entity. The reviews may be uploaded to the application and stored in a memory by a network device. The reviews may be accessible by users of the application for consideration and may add confidence about information accessible via the application. Enabling users to upload reviews to the application may minimize a need of the bank entity to have a centralized review platform.

The application may also facilitate consumer education for buying products/services (e.g., banking products and/or services). In this regard, the application may consider what similar users are doing regarding purchase of products/services (e.g., "what are people like me doing?") for example by rank, location, military occupation, demographics, or any other suitable criteria. The application may steer users toward specific education about products/services and/or reviews for people in similar settings (e.g., military NextDoor, age, gender, etc.). The application may also perform subcommunity tracking and/or identification of subcommunities to determine education about products/services to provide to similarly situated users.

Figure 3:
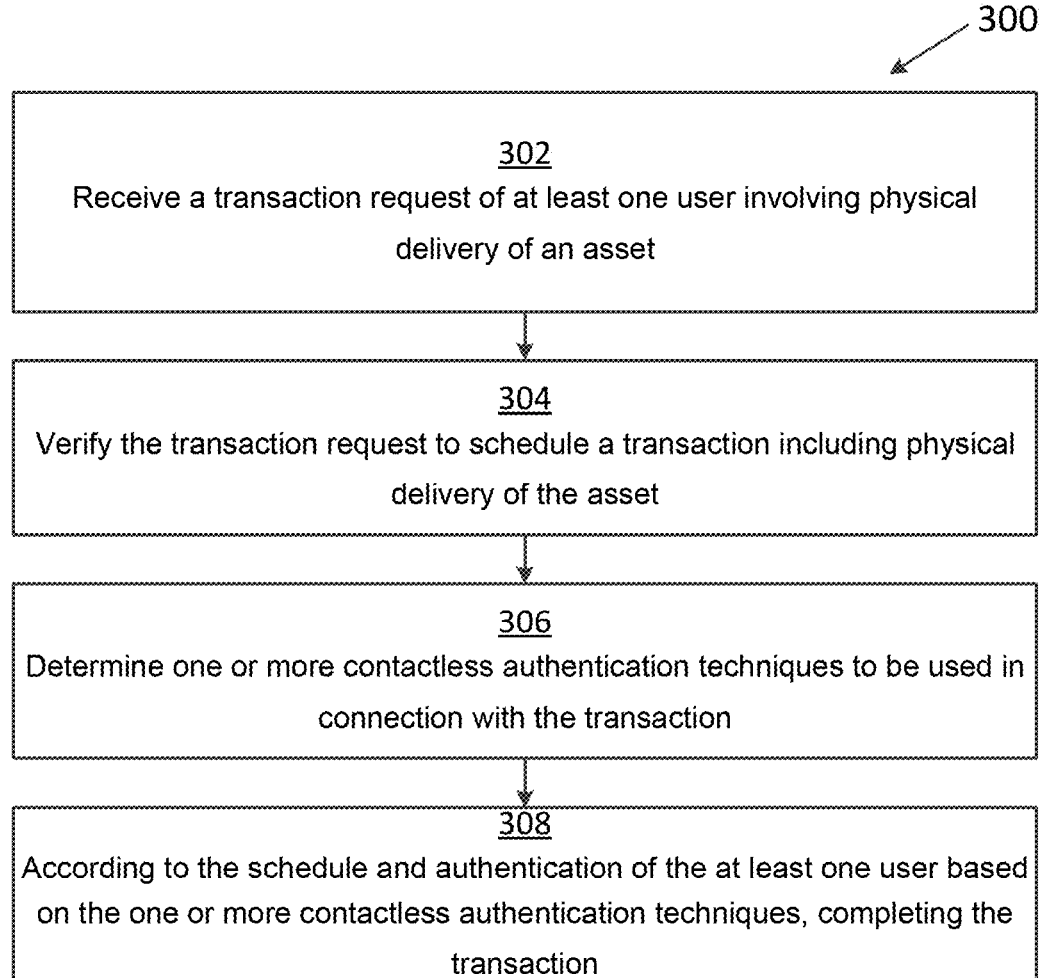
FIG. 3 illustrates an operation in accordance with exemplary embodiments of the present invention.

FIG. 3 illustrates an example flowchart illustrating operations for enabling contactless authentication techniques to facilitate access to assets according to an exemplary embodiment. At operation 302, a device (e.g., network device 160) may receive a transaction request of at least one user involving physical delivery of an asset. The asset(s) may be a banking product(s)/service(s) asset(s) and may include for example, but is not limited to, cash, money orders, checks, CDs, insurance documents, etc. The asset(s) may be provided by a bank entity. The physical delivery may be a delivery of the asset to a facility (e.g., a home, office building, etc.) associated with the user, a delivery of the asset to a site (e.g., a curbside location associated with a bank branch office, a kiosk, ATM, etc.) associated with the bank entity or another facility.

At operation 304, the device (e.g., network device 160) may verify the transaction request to schedule a transaction including physical delivery of the asset. In some example embodiments, the device may schedule the transaction according to a model (e.g., predetermined time slots for types of transactions) in response to verifying the transaction request. The transaction may include for example, but is not limited to, a banking transaction, an insurance transaction, a property transaction, a purchase/sale transaction (e.g., transactions for works of art) or any other suitable transaction. In some examples, the transaction may be an NFT transaction.

At operation 306, the device (e.g., network device 160) may determine one or more contactless authentication techniques to be used in connection with the transaction. The contactless authentication techniques may include for example, but are not limited to, contactless NFC authentication techniques, contactless vehicle recognition techniques and/or contactless biometrics techniques. In some example embodiments, the NFC authentication techniques may include verifying at least one NFC content item associated with the asset(s) is associated with the at least one user. The NFC content item may be captured from a tag (e.g., an NFC tag) associated with the asset(s). In some examples, the NFC content item may be captured (e.g., by a camera module 214), automatically, in response to a communication device (e.g., having the camera module 214) being within a predetermined proximity to the asset(s). In some exemplary embodiments, the contactless vehicle recognition techniques may include recognizing at least one vehicle associated with the at least one user. Recognizing the vehicle may include analyzing a captured image of a license plate associated with the vehicle. In yet some other exemplary embodiments, the contactless biometrics techniques may include capturing at least one image corresponding to one or more biometrics content items (e.g., facial features of a user, a fingerprint of a user, etc.) associated with the at least one user.

At operation 308, the device (e.g., network device 160) may according to the schedule and authentication of the at least one user based on the one or more contactless authentication techniques, complete the transaction. In some example embodiments, completing the transaction may include enabling the user to access the asset(s). In other example embodiments, completing the transaction may include a device (e.g., network device 160) sending a signal to a storage device to unlock the storage device having the asset(s) in response to the authentication of user. In yet some other exemplary embodiments, completing the transaction may include providing, via the physical delivery, the asset(s) to the user. The device (e.g., network device 160) may facilitate the providing of the asset(s) to the user.

Applicant has identified that conserving processing resources and memory space are important to improving any implementation of facilitating access to assets. In this regard, Applicant has identified that performing contactless authentication (e.g., in real time) associated with assets according to the exemplary embodiments of the present disclosure may conserve computing resources (e.g., processing capacity and memory space) of a computing device by enabling the computing device to minimize evaluations of manual authentications (e.g., based on data entered by users) in a brute force manner which may be computationally intensive. Minimizing the evaluations may also reduce network traffic and conserve network bandwidth which may improve the functioning of a computing device (e.g., network device 160) enabling faster computations.

Figure 4:
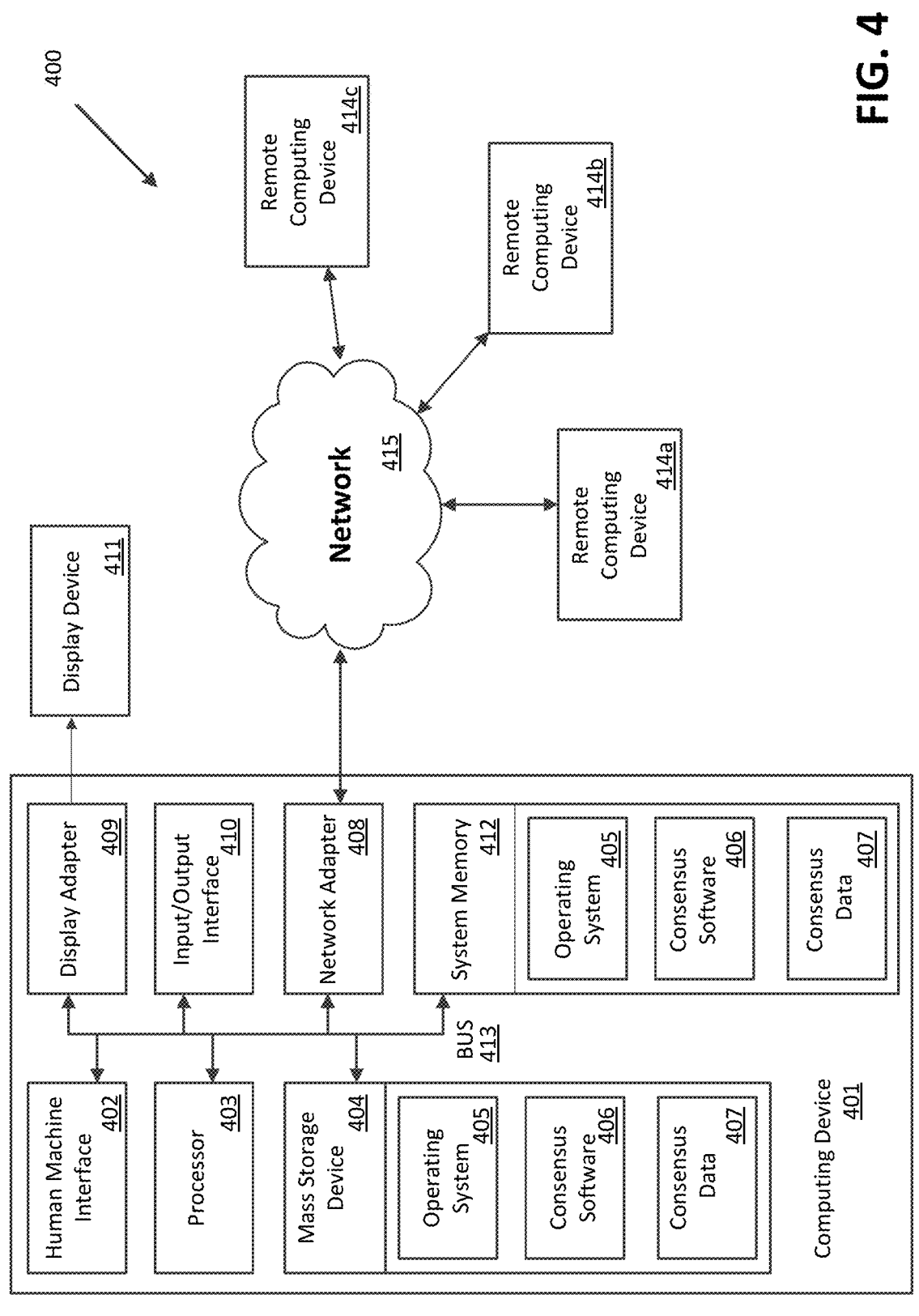
FIG. 4 shows an example computing environment.

FIG. 4 shows a block diagram illustrating an exemplary operating environment 400. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other computing system environments or configurations. Examples of computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a computing device 401. In some exemplary embodiments, the computing device 401 may be a network device (e.g., network device 160). The components of the computing device 401 may comprise, but are not limited to, one or more processors or processing units 403, a system memory 412, and a system bus 413 that couples various system components including the processor 403 to the system memory 412. In the case of multiple processing units 403, the system may utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description may also be implemented over a wired or wireless network connection and each of the subsystems, including the processor 403, a mass storage device 404, an operating system 405, entitlement software 406, entitlement data 407, a network adapter 408, system memory 412, an Input/Output Interface 410, a display adapter 409, a display device 411, and a human machine interface 402, may be contained within one or more remote computing devices 414a,b,c at physically separate locations, connected through buses of this form, in effect implementing a fully distributed system. In some exemplary embodiments, the remote computing devices 414a,b,c may be nodes 110.

The computing device 401 typically comprises a variety of computer readable media. Exemplary readable media may be any available media that is accessible by the computing device 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as entitlement data 407 and/or program modules such as operating system 405 and entitlement software 406 that are immediately accessible to and/or are presently operated on by the processing unit 403.

In another aspect, the computing device 401 may also comprise other removable/non-removable, volatile/non-volatile computer storage media. By way of example, FIG. 4 illustrates a mass storage device 404 which may provide non-volatile storage of computer code, computer readable instructions, data structures, program modules, and other data for the computing device 401. For example and not meant to be limiting, a mass storage device 404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 404, including by way of example, an operating system 405 and entitlement software 406. Each of the operating system 405 and entitlement software 406 (or some combination thereof) may comprise elements of the programming and the entitlement software 406. Entitlement data 407 may also be stored on the mass storage device 404. Entitlement data 407 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another aspect, the user may enter commands and information into the computing device 401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 403 via a human machine interface 402 that is coupled to the system bus 413, but may be connected by other interface and bus structures, such as a parallel port, game port, an IEEE 494 Port (also known as a Firewire port), a serial port, or a universal serial bus (USB).

In yet another aspect, a display device 411 may also be connected to the system bus 413 via an interface, such as a display adapter 409. It is contemplated that the computing device 401 may have more than one display adapter 409 and the computer 401 may have more than one display device 411. For example, a display device may be a monitor, an LCD (Liquid Crystal Display), or a projector. In addition to the display device 411, other output peripheral devices may comprise components such as speakers (not shown) and a printer (not shown) which may be connected to the computing device 401 via Input/Output Interface 410. Any step and/or result of the methods may be output in any form to an output device. Such output may be any form of visual representation, including, but not limited to, textual, graphical, animation, audio, tactile, and the like. The display 411 and computing device 401 may be part of one device, or separate devices.

The computing device 401 may operate in a networked environment using logical connections to one or more remote computing devices 414*a,b,c*. By way of example, a remote computing device may be a personal computer, portable computer, a smart phone, a server, a router, a network computer, a peer device or other common network node, and so on. Logical connections between the computing device 401 and a remote computing device 414*a,b,c* may be made via a network 415, such as a local area network (LAN) and a general wide area network (WAN). Such network connections may be through a network adapter 408. A network adapter 408 may be implemented in both wired and wireless environments. Such networking environments may be commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of entitlement software 406 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed:

1. A method comprising:

receiving a transaction request at a server of a business entity, wherein the transaction request involves physical delivery of an asset by a carrier to a recipient at a recipient location, wherein the recipient has an account with the business entity, and wherein the recipient location is remote from a location of the business entity;

verifying the transaction request, wherein the transaction request identifies a requested transaction of one or more transaction types;

in response to verifying the transaction request, scheduling a transaction according to a transaction model, wherein the transaction model includes specifying physical delivery of the asset at the recipient location at a scheduled time within a set of possible times for each of the transaction types;

determining one or more contactless authentication techniques to be used in connection with the transaction, wherein at least one of the one or more contactless authentication techniques comprises recognizing a vehicle associated with the recipient at the scheduled time, and wherein recognizing the vehicle comprises matching a license plate of the vehicle using a database of license plates associated with a plurality of accounts including the account of the recipient;

sending a signal to a storage device to unlock the storage device comprising the asset in response to the authentication of the recipient via the one or more contactless authentication techniques; and according to the schedule and authentication of the recipient based on the one or more contactless authentication techniques, providing, via the physical delivery, the asset to the recipient at the recipient location.

2. The method of claim 1, wherein completing the transaction comprises enabling the recipient access to the asset.

3. The method of claim 1, wherein completing the transaction comprises providing, via the physical delivery, the asset to the recipient.

4. The method of claim 1, wherein at least one of the contactless authentication techniques comprises verifying at least one near field communication content item associated with the asset is associated with the recipient.

5. The method of claim 4, wherein the near field communication content item is captured from a tag associated with the asset.

6. The method of claim 1, comprising analyzing a captured image of a license plate associated with the vehicle before matching the license plate of the vehicle using the database of license plates.

7. The method of claim 1, wherein at least one of the contactless authentication techniques comprises capturing at least one image corresponding to one or more biometrics content items associated with the recipient.

8. The method of claim 1, wherein the contactless authentication technique comprises near-field communication (NFC) communication between a device associated with the carrier and a device associated with the recipient.

9. The method of claim 8, wherein the NFC comprises providing a token to authenticate the recipient.

10. The method of claim 1, wherein two or more contactless authentication techniques are used in connection with the authentication of the recipient.

11. A device comprising:

one or more processors; and at least one memory storing instructions, that when executed by the one or more processors, cause the device to:

receive a transaction request at a server of a business entity, wherein a recipient related to the transaction request has an account with the business entity, and wherein the transaction request involves physical delivery of an asset;

verify the transaction request, wherein the transaction request identifies a requested transaction of one or more transaction types;

based on verifying the transaction request, scheduling a transaction according to a transaction model, wherein the transaction model includes specifying physical delivery of the asset at a recipient location at a scheduled time within a set of possible times for each of the transaction types;

determine one or more contactless authentication techniques to be used in connection with the transaction, wherein at least one of the one or more contactless authentication techniques comprises recognizing a vehicle associated with the recipient at the scheduled time, and wherein recognizing the vehicle comprises matching a license plate of the vehicle using a database of license plates associated with a plurality of accounts including the account of the recipient;

send a signal to a storage device to unlock the storage device comprising the asset in response to the authentication of the recipient via the one or more contactless authentication techniques; and according to the schedule and authentication of the recipient based on the one or more contactless authentication techniques, provide, via the physical delivery, the asset to the recipient at the recipient location.

12. The device of claim 11, wherein when the one or more processors further execute the instructions, the device is configured to:

complete the transaction by enabling the recipient access to the asset.

13. The device of claim 11, wherein the storage device comprises at least one of a lock box, a locker, a container, or a safe.

14. The device of claim 11, wherein when the one or more processors further execute the instructions, the device is configured to:

complete the transaction by providing, via the physical delivery, the asset to the recipient.

15. The device of claim 11, wherein at least one of the contactless authentication techniques comprises verifying at least one near field communication content item associated with the asset is associated with the recipient.

16. The device of claim 15, wherein when the one or more processors further execute the instructions, the device is configured to:

capture, from a tag associated with the asset, the near field communication content item.

17. The device of claim 11, wherein the instructions cause the device to analyze a captured image of a license plate associated with the vehicle before matching the license plate of the vehicle using the database of license plates.

18. A computer program product comprising a computer readable storage medium having instructions encoded thereon which, when executed by a processor, cause:

receiving a transaction request at a server of a business entity, wherein a recipient relating to the transaction request has an account with the business entity, and wherein the transaction request involves physical delivery of an asset;

verifying the transaction request, wherein the transaction request identifies a requested transaction of one or more transaction types;

based on the verifying, scheduling a transaction according to a transaction model, wherein the transaction model includes physical delivery of the asset at a recipient location at a scheduled time within a set of possible times for each of the transaction types;

determining one or more contactless authentication techniques to be used in connection with the transaction, wherein at least one of the one or more contactless authentication techniques comprises recognizing a vehicle associated with the recipient at the scheduled time, and wherein recognizing the vehicle comprises matching a license plate of the vehicle using a database of license plates associated with a plurality of accounts including the account of the recipient;

sending a signal to a storage device to unlock the storage device comprising the asset in response to the authentication of the recipient via the one or more contactless authentication techniques; and according to the schedule and authentication of the recipient based on the one or more contactless authentication techniques, providing, via the physical delivery, the asset to the recipient at the recipient location.

19. The computer program product of claim 18, wherein completing the transaction comprises enabling the recipient access to the asset.

20. The computer program product of claim 18, wherein the instructions when executed by the processor cause analyzing a captured image of a license plate associated with the vehicle before matching the license plate of the vehicle using the database of license plates.

* * * * *